(12) United States Patent  (10) Patent No.: US 8,462,189 B2
Kato et al.  (45) Date of Patent: Jun. 11, 2013

(54) OPTICAL SCANNER USED IN COLOR IMAGE-FORMING DEVICE

(75) Inventors: Ryota Kato, Nagoya (JP); Yasuo Tamaru, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/151,993

(22) Filed: Jun. 2, 2011

(65) Prior Publication Data

US 2011/0229206 A1 Sep. 22, 2011

Related U.S. Application Data

(63) Continuation of application No. 11/842,395, filed on Aug. 21, 2007, now Pat. No. 7,961,210.

(30) Foreign Application Priority Data

Aug. 21, 2006 (JP) .................................. 2006-224327

(51) Int. Cl.
B41J 27/00 (2006.01)

(52) U.S. Cl.
USPC ......................................................... 347/261

(58) Field of Classification Search
USPC ................. 347/229, 231–235, 241, 243, 244, 347/248–250, 257–261
See application file for complete search history.

(56) References Cited

U.S. PATENT DOCUMENTS

| | | | |
|---|---|---|---|
| 4,829,175 A | 5/1989 | Goto et al. | |
| 5,235,438 A | 8/1993 | Sasada | |
| 5,267,057 A | 11/1993 | Sasada | |
| 6,940,536 B2 | 9/2005 | Rauch et al. | |
| 7,064,877 B2 * | 6/2006 | Kato | 359/204.1 |
| 7,375,738 B2 | 5/2008 | Corbett et al. | |
| 7,639,407 B2 | 12/2009 | Clarke et al. | |
| 2003/0035042 A1 | 2/2003 | Shimada et al. | |

(Continued)

FOREIGN PATENT DOCUMENTS

| | | |
|---|---|---|
| JP | 10-307269 A | 11/1998 |
| JP | 3037249 | 4/2000 |

(Continued)

OTHER PUBLICATIONS

Partial European Search Report dated Nov. 20, 2007.

(Continued)

*Primary Examiner* — Hai C Pham

(74) *Attorney, Agent, or Firm* — Scully, Scott, Murphy & Presser, P.C.

(57) ABSTRACT

An optical scanner used for an image-forming device to form a color image includes a plurality of photosensitive drums for superimposing a developer image formed on each of the plurality of photosensitive drums. The optical scanner includes a casing, a plurality of light sources, a deflector, an optical system, and a storage device. The plurality of light sources is provided in a one-to-one correspondence with the plurality of photosensitive drums. Each of the plurality of light source emits a laser beam. The deflector is provided in the casing for deflecting the laser beam. The optical system is provided in the casing for guiding the deflected laser beam to a corresponding one of the plurality of photosensitive drums to make the laser beam scan the corresponding one of the plurality of photosensitive drums. The storage device stores a characteristic related to the laser beam scanning the corresponding one of the photosensitive drums.

7 Claims, 8 Drawing Sheets

U.S. PATENT DOCUMENTS

| | | |
|---|---|---|
| 2005/0212902 A1 | 9/2005 | Cook et al. |
| 2005/0212903 A1 | 9/2005 | Corbett et al. |
| 2006/0023231 A1 | 2/2006 | Ohmiya |
| 2006/0139715 A1 | 6/2006 | Tamaru et al. |
| 2006/0262177 A1 | 11/2006 | Wada et al. |

FOREIGN PATENT DOCUMENTS

| | | |
|---|---|---|
| JP | 2000-238392 | 9/2000 |
| JP | 2002-508902 | 3/2002 |
| JP | 2004-163936 | 6/2004 |
| JP | 2004-325891 | 11/2004 |
| JP | 2006-178372 | 7/2006 |
| WO | 98/56164 | 12/1998 |

OTHER PUBLICATIONS

Extended European Search Report dated Jan. 10, 2008.
Office Action issued in corresponding European Patent Application No. 07016281.3.

* cited by examiner

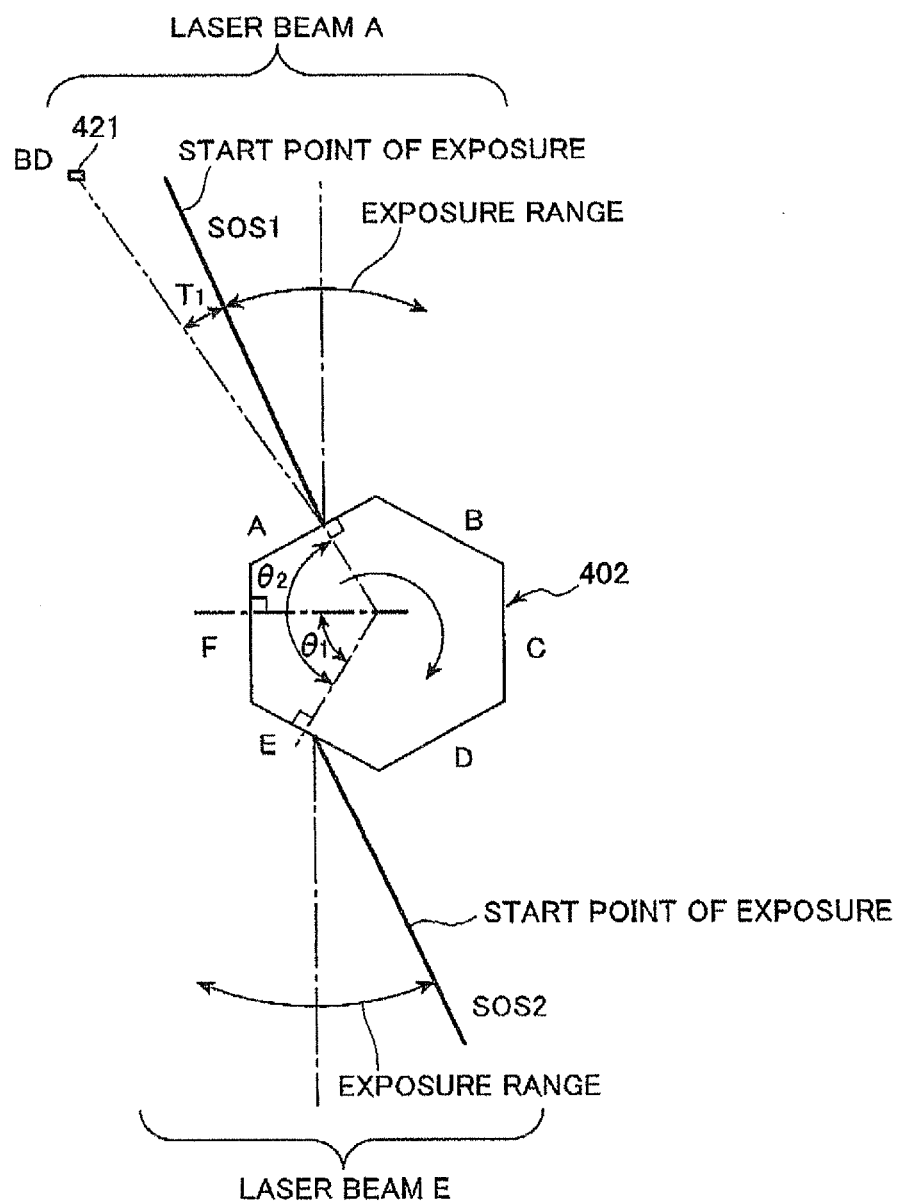

OPTICAL SCANNER USED IN COLOR IMAGE-FORMING DEVICE

CROSS REFERENCE TO RELATED APPLICATION

This application is a Continuation of application Ser. No. 11/842,395 filed Aug. 21, 2007. The entire content of this prior application is incorporated herein by reference.

This application claims priority from Japanese Patent Application No. 2006-224327 filed Aug. 21, 2006. The entire content of this priority application is incorporated herein by reference.

TECHNICAL FIELD

The present invention relates to an optical scanner for scanning a laser beam, and an image-forming device employing the optical scanner.

BACKGROUND

An electrophotographic image-forming device well known in the art, such as a laser printer, forms images on a recording medium by exposing a photosensitive drum to a laser beam emitted from an optical scanner (scanning device) to carry a developer image on the photosensitive drum, and by transferring the developer image from the photosensitive drum to the recording medium such as a sheet or a transparency.

A color laser printer includes a plurality of photosensitive drums corresponding to each color employed in the printer. After the scanning device scans each photosensitive drum, forming an electrostatic latent image on the photosensitive drum, developer is supplied to the latent image to form a developer image on the photosensitive drum. Subsequently, a color image is formed on a recording medium by superimposing each of the developer images on the recording medium (see Japanese patent application publication No. 2006-178372).

As is clear from the above description, if the electrostatic latent images are not formed precisely on the photosensitive drums when the drums are exposed by the scanning device, color registration problems will appear in the resulting image formed on the recording medium.

Further, the scanning device has an optical scanning system configured of a polygon mirror or other deflector, fθ lenses, and reflecting mirrors for guiding a laser beam emitted from a light source configured of a semiconductor lasers to the photosensitive drum. Hence, the laser beam scanned over the photosensitive drum is greatly affected by the dimensional tolerance, mounted positions, and adjustment tolerance of the deflector and the optical scanning system.

Normally, the effects of variations in the dimensions of the deflector and the optical scanning system and variations in the mounting positions of the same can be absorbed by measuring properties of the laser beam scanned over the photosensitive drum (the scanning linearity of scan line and trajectory of scan line) with a special measuring device and by adjusting the timing for emitting the laser beam based on the results of the measurement.

However, since the laser emitting timings of the laser beams must be adjusted based on the results of measuring properties related to the laser beam (hereinafter referred to as laser beam properties) after the scanning device is mounted in the printer, the scanning device cannot easily be replaced or repaired.

In other words, it is difficult to replace of repair the scanning device without taking the device to a service center equipped with the measuring device required for measuring laser beam properties (hereinafter referred to as a special service center). Hence, if the laser printer is already in the possession of the end-user, for example, the end-user must transport the printer to a special service center to replace or repair the scanning device, making it difficult to provide the end-user with prompt maintenance and service.

SUMMARY

In view of the foregoing, it is an object of the present invention to provide an optical scanner used for an image-forming device which is easily replaced and adjusted to the image-forming device.

The present invention provides an optical scanner used for an image-forming device to form a color image, the image-forming device having a plurality of photosensitive drums for superimposing a developer image formed on each of the plurality of photosensitive drums. The optical scanner includes a casing, a plurality of light sources, a deflector, an optical system, and a storage device. The plurality of light sources is provided in a one-to-one correspondence with the plurality of photosensitive drums. Each of the plurality of light source emits a laser beam. The deflector is provided in the casing for deflecting the laser beam. The optical system is provided in the casing for guiding the deflected laser beam to a corresponding one of the plurality of photosensitive drums to make the laser beam scan the corresponding one of the plurality of photosensitive drums. The storage device stores a characteristic related to the laser beam scanning the corresponding one of the photosensitive drums.

The present invention provides An image-forming device, having a main casing, a sheet feed unit, an image-forming unit, an optical scanning unit, and a controller. The sheet feed unit is provided in the main casing that feed a sheet in a sheet feed direction. The image-forming unit is provided in the main casing. The image-forming unit includes comprising a plurality of photosensitive drums for superposing a developer image formed on each of the photosensitive drums to form a color image on a recording medium. The plurality of photosensitive drums is arranged in series in the sheet feed direction. The optical scanning unit is provided in the main casing. The optical scanning unit includes a casing, a plurality of light sources, a deflector, an optical system, and a storage device. The plurality of light sources is provided in a one-to-one correspondence with the plurality of photosensitive drums. Each of the plurality of light source emits a laser beam. The deflector deflects the laser beam. The optical system is provided in the casing for guiding the deflected laser beam to a corresponding one of the plurality of photosensitive drums to make the laser beam scan the corresponding one of the plurality of photosensitive drums in a scanning direction orthogonal to the sheet feed direction. The storage device is provided in the casing that stores a characteristic related to the laser beam scanning the corresponding one of the photosensitive drums. The controller controls emission of the laser beam for exposing the corresponding one of the plurality of photosensitive drums according to the characteristic.

BRIEF DESCRIPTION OF THE DRAWINGS

The particular features and advantages of the invention as well as other objects will become apparent from the following description taken in connection with the accompanying drawings, in which:

FIG. 10 is a diagram illustrating a deflected laser beam by a polygon mirror;

DETAILED DESCRIPTION

In the following description, an optical scanner according to the present invention will be described, being applied to an electrophotographic color image-forming device (color laser printer). The expressions "front", "rear", "above" and "below" are used throughout the description to define the various parts when the image-forming device is disposed in an orientation in which it is intended to be used.

Figure 1:
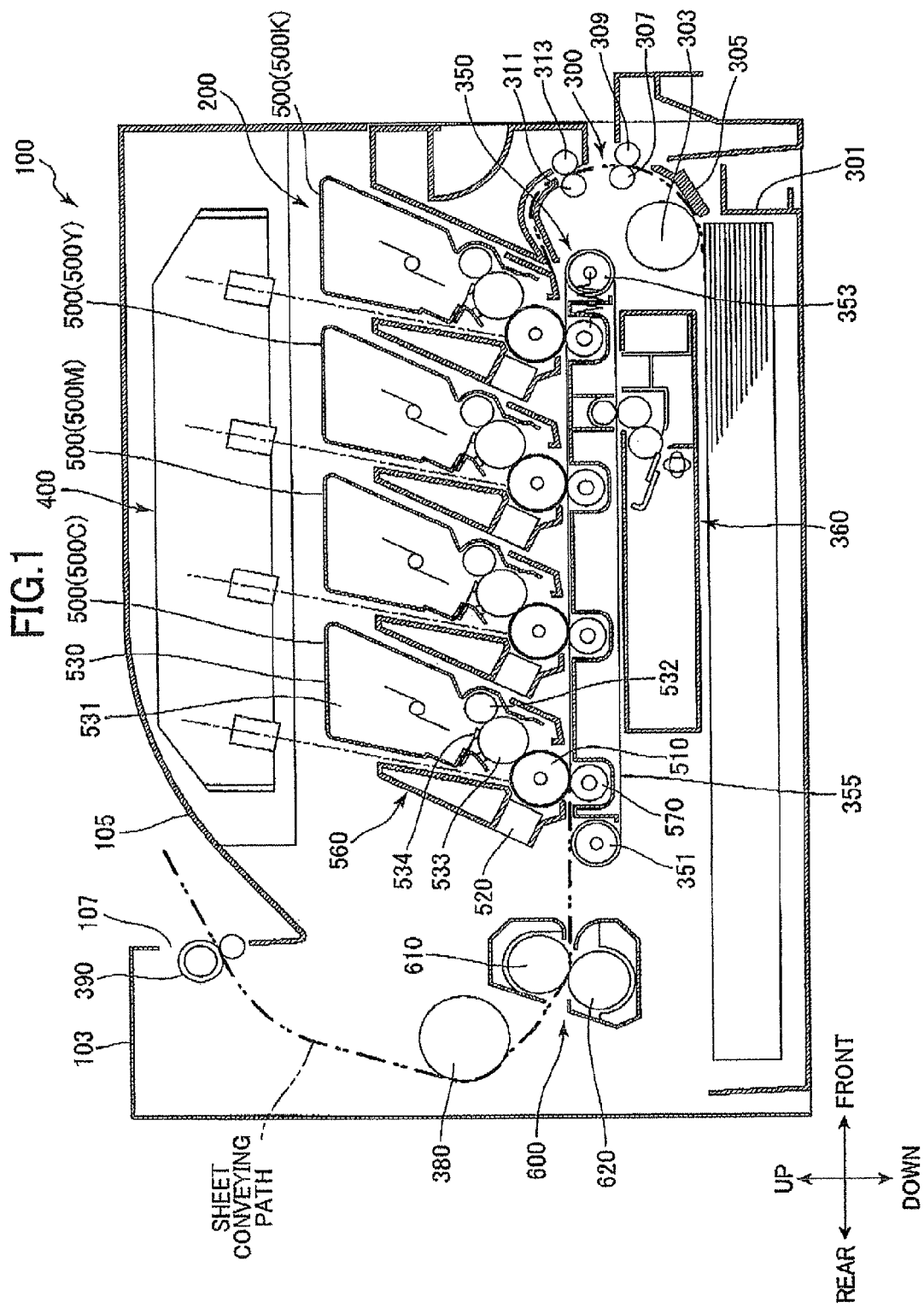
FIG. 1 is a side cross-sectional view showing a color laser printer according to the present invention.

Referring to FIG. 1, a laser printer 100 includes a casing 103 having a substantially box-like shape (cubical shape). A discharge tray 105 is formed on the top surface of the casing 103 for receiving and supporting a recording medium, such as paper or transparency sheets (hereinafter simply referred to as paper), discharged from the casing 103 after printing.

The laser printer 100 includes an image-forming unit 200 for forming images on paper, and a feeding unit 300 for supplying paper to the image-forming unit 200 in a paper feeding direction together with a conveying mechanism 350. The conveying mechanism 350 conveys paper to four process cartridges 500K, 500Y, 500M, and 500C (hereinafter collectively referred to as process cartridges 500) in the image-forming unit 200.

After the image-forming unit 200 has formed an image on the paper, an intermediate conveying roller 380 conveys the paper upward along a discharge chute (not shown). The discharge chute changes the conveying direction substantially 180 degrees. A discharge roller 390 is disposed on the upper end of the discharge chute to discharge the paper through a discharge outlet 107 onto the discharge tray 105.

The feeding unit 300 includes a paper tray 301 accommodated in the bottommost section of the casing 103, a feeding roller 303 disposed above the downstream end of the paper tray 301 with respect to the conveying direction of the paper for feeding the paper from the paper tray 301 to the image-forming unit 200, and a separating pad 305 for applying a prescribed resistance to the paper so that the paper fed by the feeding roller 303 is separated and conveyed one sheet at a time.

The feeding roller 303 conveys paper toward the front side of the casing 103 from the paper tray 301. The conveyed paper subsequently follows a U-shaped path and is conveyed to the image-forming unit 200 disposed substantially in the center region of the casing 103.

In the substantially U-shaped section of the paper-conveying path leading from the paper tray 301 to the image-forming unit 200, a conveying roller 307 is provided for applying a conveying force to the paper. And a pinch roller 309 is disposed in opposition to the conveying roller 307 for pressing the paper against the conveying roller 307. A coil spring or other elastic member (not shown) is provided for pressing the pinch roller 309 toward the conveying roller 307.

A registration roller 311 and a pinch roller 313 are disposed facing each other downstream of the conveying roller 307 in the paper-conveying direction. The registration roller 311 and pinch roller 313 correct skew in the paper conveyed by the conveying roller 307 when the leading edge of the paper contacts the registration roller 311 and pinch roller 313, and subsequently the registration roller 311 continues to convey the paper to the image-forming unit 200. A coil spring or other elastic member (not shown) is provided for pressing the pinch roller 313 against the registration roller 311.

The conveying mechanism 350 includes a drive roller 351 that rotates in association with the operation of the image-forming unit 200, a follow roller 353 disposed in a position separated from the drive roller 351 and capable of rotating, and a conveying belt 355 stretched around the drive roller 351 and follow roller 353.

The conveying belt 355 moves circularly along with the rotation of the drive roller 351 and follow roller 353. When a sheet of paper is conveyed from the paper tray 301 onto the conveying belt 355, the circularly moving conveying belt 355 sequentially conveys the sheet to the four process cartridges 500K, 500Y, 500M, and 500C in the front-to-rear direction of the laser printer 100.

In this embodiment, a belt cleaner 360 is disposed on the underside of the conveying mechanism 350 for removing waste toner deposited on the surface thereof.

The image-forming unit 200 has a scanning unit 400, the process cartridges 500, and a fixing unit 600. The image-forming unit 200 is configured of a direct tandem system capable of printing color images.

More specifically, the four process cartridges 500K, 500Y, 500M, and 500C corresponding to the four toner colors black (K), yellow (Y), magenta (M), and cyan (C) are juxtaposed in the order given with respect to the paper-conveying direction.

Since the four process cartridges 500K, 500Y, 500M, and 500C have the same construction, differing only in the color of toner employed, the process cartridges 500K, 500Y, 500M, and 500C are collectively referred to as the process cartridges 500 in the following description.

The scanning unit 400 functions to irradiate a laser beam onto a photosensitive drum 510, forming an electrostatic latent image on the surface of the photosensitive drum 510.

As shown in FIG. 1, the scanning unit 400 is disposed in the casing 103 above the process cartridges 500. The scanning unit 400 emits four laser beams to the photosensitive drums 510 through the bottom surface of the scanning unit 400.

Figure 3:
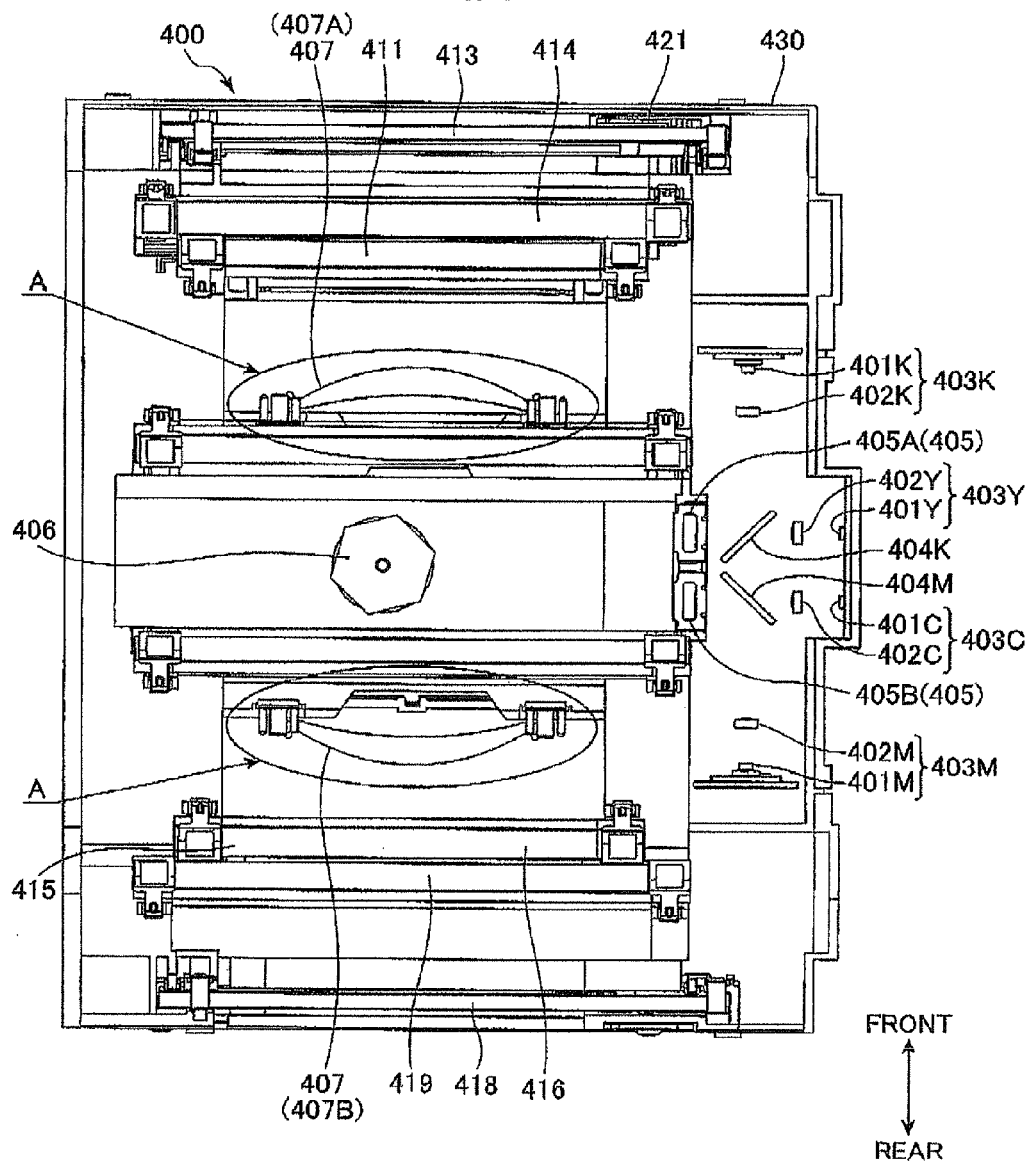
FIG. 3 is a plan view showing the scanning unit according to a first embodiment.

As shown in FIG. 3, the four laser beams are emitted by semiconductor lasers 401K, 401Y, 401M, and 401C (hereinafter collectively referred to as semiconductor lasers 401). Collimator lenses 402K, 402Y, 402M, and 402C (hereinafter collectively referred to as collimator lenses 402) are disposed on the light-irradiating sides of the respective semiconductor lasers 401 for correcting divergent light rays emitted from the respective semiconductor lasers 401 into a beam of parallel rays.

Hence, the semiconductor lasers 401 and collimator lenses 402 constitute light sources 403 for emitting beams of light. Therefore, the semiconductor lasers 401 and collimator lenses 402 are referred to together as the light sources 403 in the following description, and the light sources 403 are referred to individually as light sources 403K, 403Y, 403M, and 403C.

The light source 403K functions to irradiate a light beam onto a photosensitive drum 510K of the process cartridge 500K (see FIG. 2), the light source 403Y functions to irradiate a light beam onto a photosensitive drum 510Y of the process cartridge 500Y, the light source 403M functions to irradiate a light beam onto a photosensitive drum 510M of the process cartridge 500M, and the light source 403C functions to irradiate a light beam onto a photosensitive drum 510C of the process cartridge 500C.

The scanning unit 400 also includes a mirror 404K for deflecting the light beam emitted from the light source 403K at approximately 90 degrees to direct the light beam to a cylindrical lens 405A, and a mirror 404M for deflecting the light beam emitted from the light source 403M at approximately 90 degrees to direct the light beam to a cylindrical lens 405B.

Light guiding members (not shown) are disposed on the far side of the mirrors 404K and 404M in FIG. 3 for guiding the light beam emitted from the light source 403Y to the cylindrical lens 405A and for guiding a light beam emitted from the light source 403C toward the cylindrical lens 405B.

The cylindrical lens 405A refracts the light beams emitted from the light sources 403K and 403Y and guided to the cylindrical lens 405A, irradiating the light beams at different angles of incidence from each other onto reflecting surfaces of a polygon mirror 406. Similarly, the cylindrical lens 405B refracts the light beams emitted from the light sources 403M and 403C and guided to the cylindrical lens 405B, irradiating the light beams at different angles of incidence from each other onto reflecting surfaces of the polygon mirror 406.

The polygon mirror 406 is a deflector for deflecting and scanning a light beam emitted from the light source 403. In this embodiment, the polygon mirror 406 is configured of a plurality of reflecting mirrors arranged in a polygonal shape (hexagonal shape in this embodiment) in a cross section, and is rotatable about a central axis thereof. A drive motor (not shown) rotates the polygon mirror 406 to scan the light beam reflected from the reflecting surface of the polygon mirror 406 over a predetermined length.

The scanning unit 400 also includes fθ lenses 407A and 407B (hereinafter collectively referred to as fθ lenses 407) for adjusting the scanned velocity of the laser beam. Specifically, the fθ lenses 407 correct the velocity of the laser beam scanned in the left-to-right direction in FIG. 3 (main scanning direction) by the polygon mirror 406 from a constant angular velocity to a constant linear velocity over the photosensitive drums 510. It is noted that the main scanning direction is orthogonal to the paper feeding direction and a sub-scanning direction is parallel to the paper feeding direction.

Figure 2:
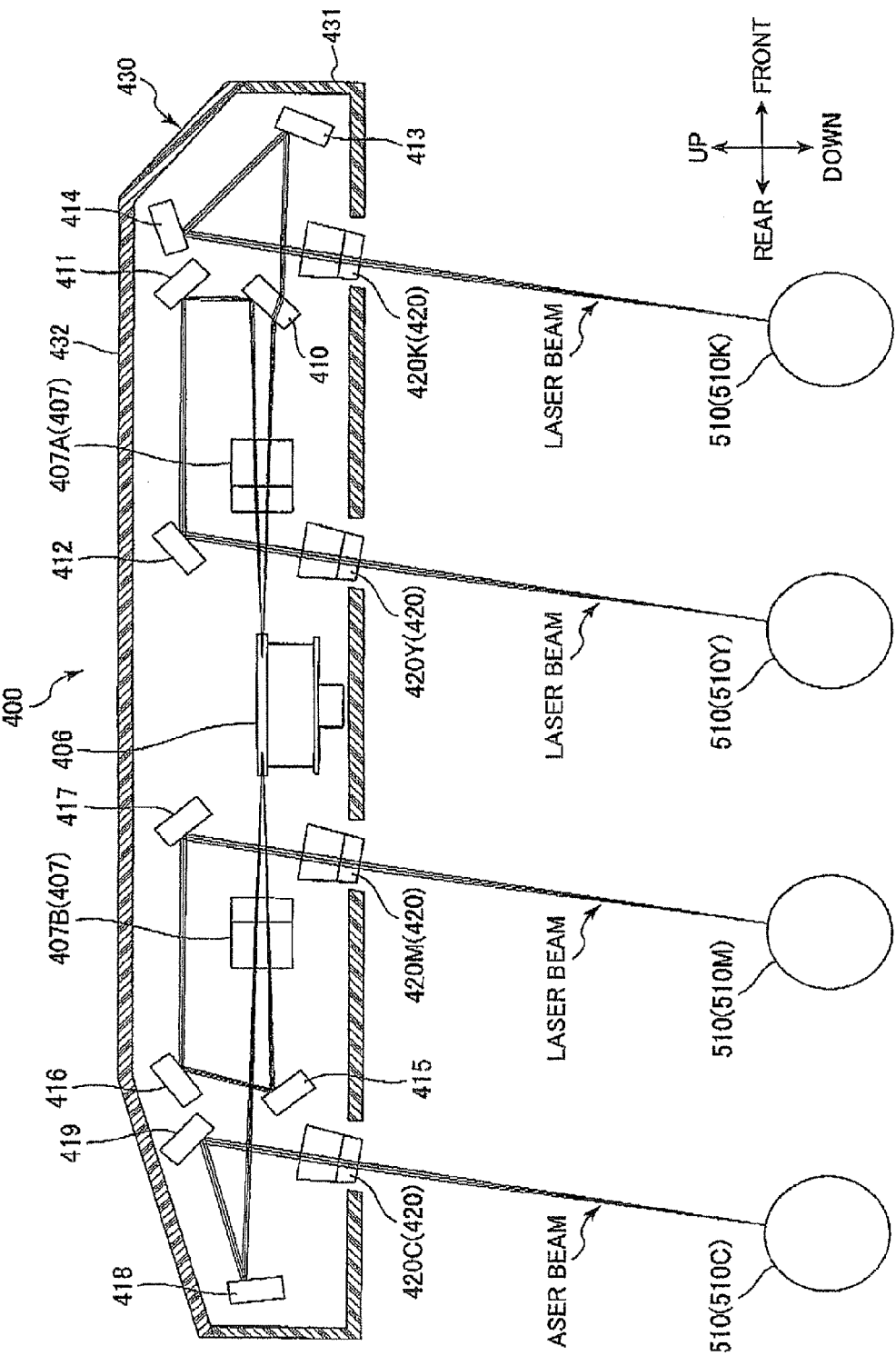
FIG. 2 is a side cross-sectional view showing a scanning unit according to the first embodiment.

As shown in FIG. 2, after each the fθ lens 407 converts the scanning speed of the light beam, the light beam is focused on the respective photosensitive drum 510 by optical members configured of a plurality of mirrors 410-419, and toric lenses 420K, 420Y, 420M, and 420C (hereinafter collectively referred to as toric lenses 420).

The curvature of the toric lenses 420 differs between the main scanning direction and sub-scanning direction of the light beam and functions to correct face tangle error by deflecting in the sub-scanning direction the light beam reflected by the polygon mirror 406 in a direction different from the prescribed direction.

With the scanning unit 400 having the above construction, each light source 403 irradiates a laser beam based on image data. These laser beams pass through the cylindrical lenses 405A and 405B (hereinafter collectively referred to as cylindrical lenses 405), are deflected and scanned by the polygon mirror 406, are converted to a constant linear scanning velocity by the fθ lenses 407, are reflected onto different optical axes by the mirrors 410-419, and are subsequently irradiated out of the scanning unit 400 through the toric lenses 420 and focused on the photosensitive drums 510.

Referring to FIG. 2 again, the mirror 410 does not reflect all light beams. Specifically, the mirror 410 reflects the light beam emitted from the light source 403C to the mirror 411, while deflecting and transmitting the light beam emitted from the light source 403K to the mirror 413.

The scanning unit 400 also includes a casing 430 for accommodating the polygon mirror 406, the mirrors 410-419, the fθ lenses 407, and the toric lenses 420 and for protecting these components from dust.

The casing 430 is configured of a scanner frame 431 on which the mirrors 410-419, the toric lenses 420, and the like are mounted and fixed; and a scanner cover 432 covering the side of the scanner frame 431 opposite the process cartridges 500. The scanner frame 431 and scanner cover 432 are formed of a PC/ABS polymer alloy through injection molding.

As shown in FIG. 3, a beam detect (BD) sensor 421 is disposed in the casing 430 for detecting the light beam deflected and scanned by the polygon mirror 406. The timing for beginning exposure of each photosensitive drum 510 is controlled based on the timing at which the BD sensor 421 detects the light beam.

Specifically, the laser printer 100 determines that the laser beam is guided to an edge of an image-forming region on the photosensitive drum 510 in the scanning direction when a prescribed time has elapsed after the BD sensor 421 detects the laser beam. At this time, the controller 110 sends a video signal into the respective semiconductor laser 401 for forming an electrostatic latent image on the respective photosensitive drum 510.

Since the four process cartridges 500 have the same construction, differing only in the color of toner employed, the process cartridge 500C will be described in detail below to explain the structure of the process cartridges 500.

As shown in FIG. 1, the process cartridge 500 is detachably provided in the casing 103 beneath the scanning unit 400. Each process cartridge 500 includes the photosensitive drum 510, a charger 520, and a toner-accommodating section 530, all accommodated in a casing 560.

The photosensitive drum 510 is formed of a photosensitive material for carrying an image to be transferred onto paper. The photosensitive drum 510 is configured in a cylindrical shape, the outermost surface of which is coated with a positive-charging photosensitive layer of polycarbonate. The photosensitive drum 510 is rotatable about a center axis thereof. The center axis extends orthogonally to the paper feeding direction.

The charger 520 functions to charge the surface of the photosensitive drum 510. The charger 520 is disposed in opposition to the photosensitive drum 510 at a position diagonally above and rearward of the same and is separated from the photosensitive drum 510 by a prescribed distance.

The charger 520 is a Scorotron charger having a charging wire formed of tungsten. The charging wire generates a corona discharge for charging the surface of the photosensitive drum 510 with a uniform positive polarity.

A transfer roller 570 is disposed in opposition to each photosensitive drum 510 so that the conveying belt 355 is interposed therebetween. The transfer roller 570 rotates in association with the circular movement of the conveying belt 355. As a sheet of paper passes by each of the photosensitive drums 510, the respective transfer rollers 570 apply a charge opposite to the polarity of the photosensitive drums 510 (a negative charge in this embodiment) to the paper for transferring toner carried on the photosensitive drum 510 onto the paper.

The toner-accommodating section 530 includes a toner-accommodating chamber 531 accommodating toner, a supply roller 532 for supplying toner to the photosensitive drum 510, and a developing roller 533. The toner-accommodating section 530 can be detached from the main body of the process cartridge 500.

The supply roller 532 rotates to supply toner from the toner-accommodating chamber 531 to the developing roller 533 so that toner is carried on the surface of the developing roller 533. A thickness-regulating blade 534 regulates the thickness of the layer of toner on the developing roller 533 to a prescribed uniform thickness. Subsequently, the toner on the developing roller 533 is supplied to the photosensitive drum 510 exposed by the scanning unit 400.

The fixing unit 600 is disposed on the rear side of the process cartridge 500C in the paper-conveying direction and functions to fix toner onto the paper by melting the toner with heat.

More specifically, the fixing unit 600 includes a heating roller 610 disposed on the printing side of the paper for heating the toner while providing a conveying force to the paper. A pressure roller 620 is disposed on the opposite side of the paper from the heating roller 610 for pressing the paper against the heating roller 610.

The heating roller 610 is driven to rotate in synchronization with the developing rollers 533 and the conveying belt 355. The pressure roller 620 receives the rotational force of the heating roller 610 through the paper contacting the heating roller 610 and follows the rotation of the same.

The image-forming unit 200 forms images on paper as follows. As the photosensitive drums 510 rotate, the chargers 520 charge the surfaces of the photosensitive drums 510 with a uniform positive polarity. Subsequently, the scanning unit 400 irradiates laser beams onto the photosensitive drums 510 in a high-speed scan, thereby forming electrostatic latent images on the photosensitive drums 510 corresponding to an image to be formed on paper.

As the developing rollers 533 rotate, the positively charged toner on the developing rollers 533 comes into contact with the respective photosensitive drums 510. At this time, the toner is supplied to the electrostatic latent images on the photosensitive drums 510, i.e. regions of the photosensitive drums 510 carrying a uniformly positive charge that have been exposed by the laser beam and, therefore, have a lower potential. The supplied toner develops the electrostatic latent images into visible images according to a reverse development process so that toner images are carried on the surfaces of the photosensitive drums 510.

Subsequently, the toner images on the photosensitive drums 510 are transferred onto the paper by the transfer bias applied to the transfer rollers 570. Next, the paper is conveyed to the fixing unit 600, where the toner image formed by toner on the paper is fixed to the paper by heat, thereby completing image formation.

Figure 4:
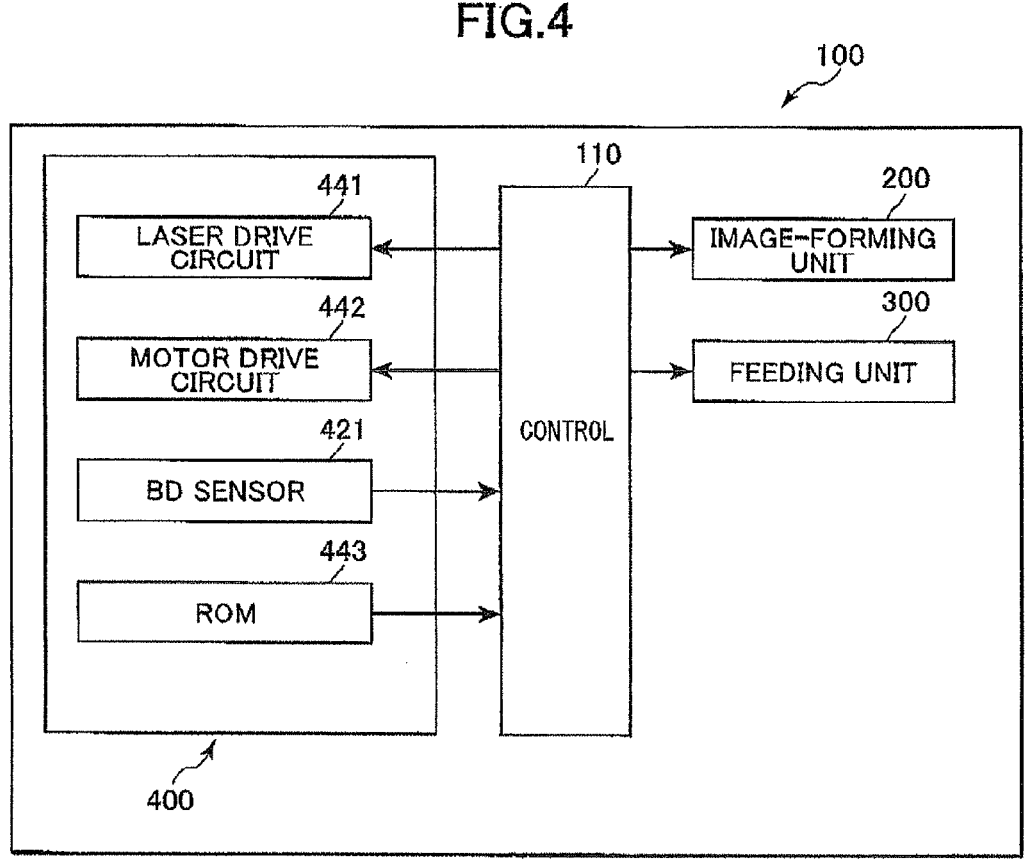
FIG. 4 is a block diagram showing a control system of the laser printer.

Referring to FIG. 4, the laser printer 100 includes a controller 110 in the casing 103 to control the image-forming unit 200, the feeding unit 300, and the scanning unit 400. The scanning unit 400 is provided with a semiconductor laser driving circuit 441 for controlling each semiconductor laser 401 to emit light, a polygon motor driving circuit 442 for driving the polygon motor to rotate, the BD sensor 421, and a ROM 443 configured of flash memory or another semiconductor storage device for storing information indicating characteristics related to the laser beams scanned over the photosensitive drum 510 (hereinafter referred to as laser beam characteristics).

The controller 110 reads output signals from the BD sensor 421 and the laser beam characteristics stored in the ROM 443. The controller 110 is a microcomputer configured of a CPU, ROM, and RAM. The controller 110 controls the image-forming unit 200 and the like based on programs stored in the ROM. The controller 110 controls the image-forming unit 200, feeding unit 300, semiconductor laser driving circuit 441, and polygon motor driving circuit 442 based on the output signals from the BD sensor 421 and the laser beam characteristics.

Figure 5:
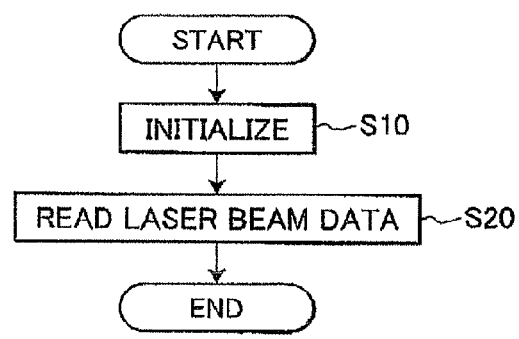
FIG. 5 is a flowchart illustrating a control process executed by the controller when the laser printer is activated.

Referring to FIG. 5, when the laser printer 100 is started, the controller 110 operates according to a control process shown in FIG. 5. When the power to the laser printer 100 is turned on, in S10 the controller 110 initializes parameters (variables) for controlling the laser printer 100. In S20 the controller 110 reads the laser beam characteristics from the ROM 443 and stores the characteristics in the RAM of the controller 110.

The next description will be made for explaining an expose process. After the photosensitive drum 510 is exposed to the laser beam scanning in the main scanning direction to form an electrostatic latent image on the photosensitive drum 510, toner is supplied to the photosensitive drum 510 to form a toner image thereon. Generally, the laser beam scanning in the main scanning direction makes a scan line extending straight in the main scanning direction. Next, the toner images formed on the photosensitive drums 510K, 510Y, 510M, and 510C are transferred onto the paper so as to be superimposed over each other, forming a color image.

At this time, the controller 110 controls the start timing of the laser emission (exposure timing) of the semiconductor lasers 401 based on the elapsed time after a reference timing, the reference timing being the timing at which the BD sensor 421 detects the laser beam. Hence, when the scanning velocity of scan line on the photosensitive drums differs among the photosensitive drums 510, the position corresponding to the same portion of the image to be formed also differ among the photosensitive drums 510, resulting in color registration problems when the toner images are transferred onto the paper.

Therefore, it is preferable to produce the same scanning velocity of the scan lines and the same linearity of the scan lines for all photosensitive drums 510.

However, the linearity of the scan line generally depends on a manufacture error of the fθ lenses 407, polygon mirror 406, and casing 430, error in mounting these components, and rotational irregularity of the polygon motor.

Therefore, the scanning unit 400 has scanning linearity data stored in the ROM 443 for each of the photosensitive drums 510 inspected by the manufacturer upon completion of the scanning unit 400. The controller 110 corrects the laser-emitting timing of the semiconductor laser 401 based on the scanning linearity data stored in the ROM 443 to prevent discrepancies in the positions of toner images to be formed as the images on the paper.

Generally, the light beam characteristics are measured by mounting the scanning unit 400 in a special measuring instrument after the scanning unit 400 is assembled.

Figure 6:
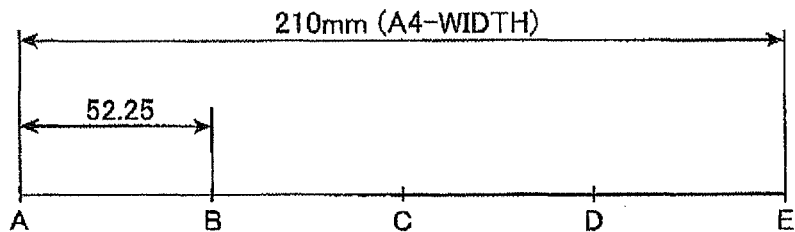
FIG. 6 is a diagram showing a unit for measuring a scanning linearity of a scan line.

As shown in FIG. 6, a scan line on the photosensitive drum 510 has been divided into a plurality of sections, and the ROM 443 stores scanning times for each section of the scan line as the scanning linearity. In this embodiment, the width dimension of the paper (scanning width) is divided into four sections, and the time required to scan each section of the scanning width is stored in the ROM 443.

The photosensitive drum 510 is exposed to the laser beam scanned along a scan line following the axial direction of the photosensitive drum 510. If the scan line follows a curved or sloped path, the toner image formed on the photosensitive drum 510 is distorted, thereby reducing the quality of the image formed on the paper.

Therefore, the trajectories of the scan lines are stored in the ROM 443. The controller 110 corrects the laser-emitting timing (exposure timing) of the semiconductor lasers 401 based on the trajectories of scan lines stored in the ROM 443 to prevent distortion in the toner images.

Figure 7:
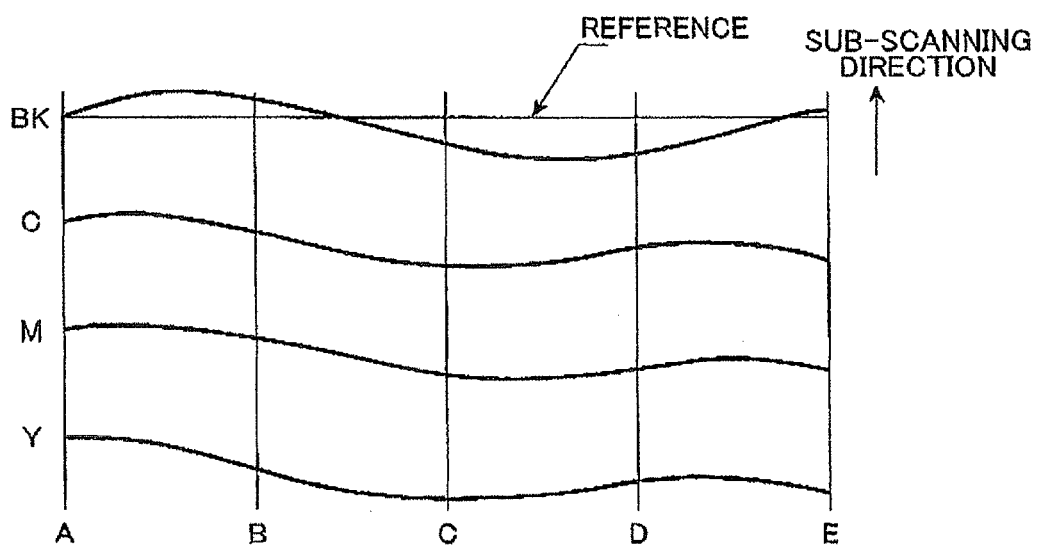
FIG. 7 is a diagram showing actual trajectory of the scan line.

As shown in FIG. 7, the ROM 443 stores values indicating the amount of deviation from a reference position in the sub-scanning direction (a direction orthogonal to the main scanning direction) at the points of division between the plurality of segments in the scanning range as the trajectory of the scan line. It is noted that the reference position is an ideal position for the laser beam to scan on the photosensitive drum 510 in order to form the image without any distortion or color registration problems.

Since the photosensitive drums 510 are juxtaposed in the paper-conveying direction, the start point of the exposure process is offset for each of the photosensitive drums 510 for the same position of the image. However, since the controller 110 forms a color image on paper by superimposing toner images formed on all of the photosensitive drums 510, an actual start position of each scan line for the exposure process on each photosensitive drum 510 is required to overlap the reference position for all scan lines.

Figure 8:
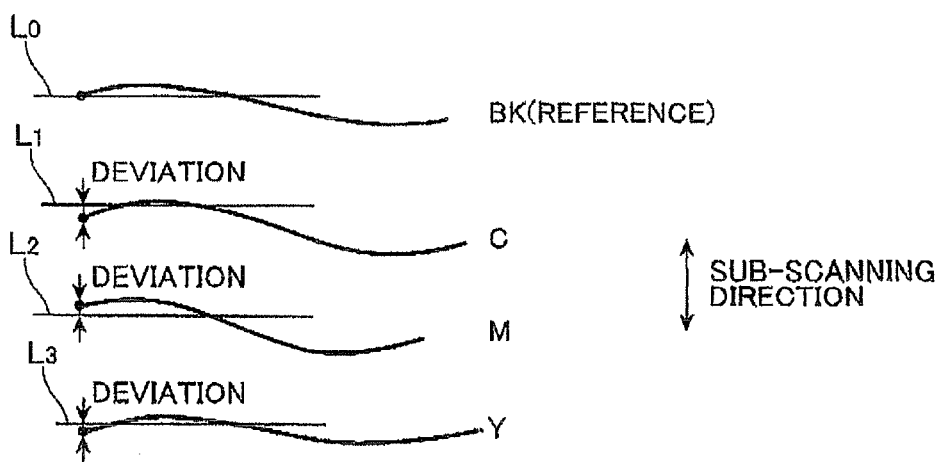
FIG. 8 is a diagram illustrating a deviation in a sub-scanning direction between a start position for exposure for each scan line and a reference positions.

Hence, in this embodiment, a prescribed position $L_0$ is set as the reference position on the photosensitive drum 510K, as shown in FIG. 8. Then, the amount of deviation between reference positions $L_1$-$L_3$ on the photosensitive drums 510C, 510M, and 510Y that correspond to the prescribed position $L_0$ on the photosensitive drum 510K. The start of scan position for the respective scan lines are stored in the ROM 443 as the trajectories of the scan lines.

In this embodiment, the laser beam reflected from the same reflecting surface of the polygon mirror 406 is treated as one unit, and the laser emitting timing of the semiconductor laser 401 is calibrated to correct deviations between the start of scan position of the scan lines and the reference positions $L_0$-$L_3$.

Since the start of the exposure process is determined for each photosensitive drum 510 based on when the BD sensor 421 detects the laser beam, the start point of the exposure process for each photosensitive drum 510 is required to correspond to the same position on the conveyed paper.

Specifically, the scan lines scanned by the scanning unit 400 run parallel to the recording surface of the paper and orthogonal to the paper-conveying direction. Further, the controller 110 forms color images on paper by superimposing toner images formed on each of the photosensitive drums 510. Therefore, the position at which exposure is begun on each photosensitive drum 510 must the same position relative to the paper.

When there is deviation among positions on the paper corresponding to the start position of the exposure process for the photosensitive drums 510, the toner images transferred onto the paper will be offset from each other, producing color registration problems in the resulting image.

Figure 9:
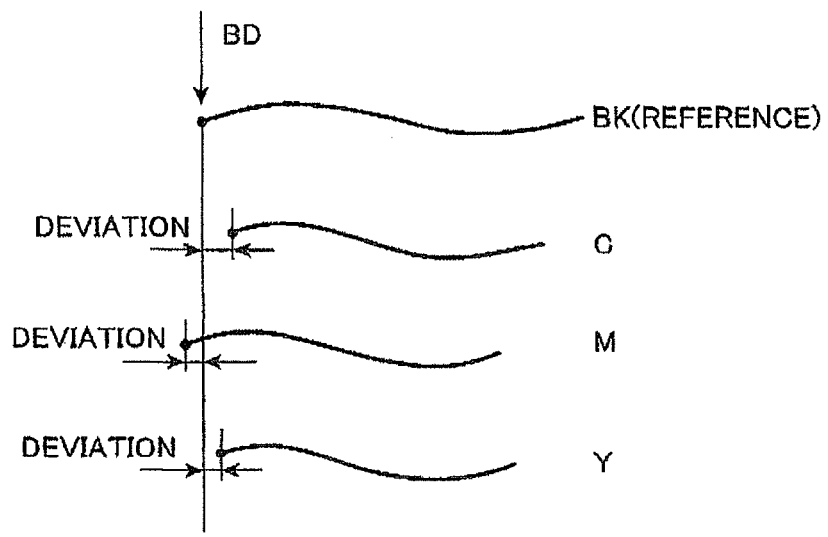
FIG. 9 is a diagram illustrating deviations in the start point for exposure.

Therefore, the start point of the exposure process for each photosensitive drum 510 is stored in the ROM 443. FIG. 9 is an explanatory diagram illustrating deviations in the start point of the exposure process. The controller 110 corrects the laser emitting timings of the semiconductor lasers 401 based on the start point of the exposure process for the respective photosensitive drums 510 stored in the ROM 443 to prevent problems in color registration in the resulting image formed on the paper.

Since the number of BD sensors 421 is less than the number of photosensitive drums 510, a reference timing is defined as the timing at which the BD sensor 421 detects a specific laser beam (the laser beam guided to the photosensitive drum 510K), unlike when a BD sensor is provided for each laser beam guided to the photosensitive drums 510. The start timing of the exposure process for each photosensitive drum 510 is established based on elapsed time after the reference timing.

Figure 11:
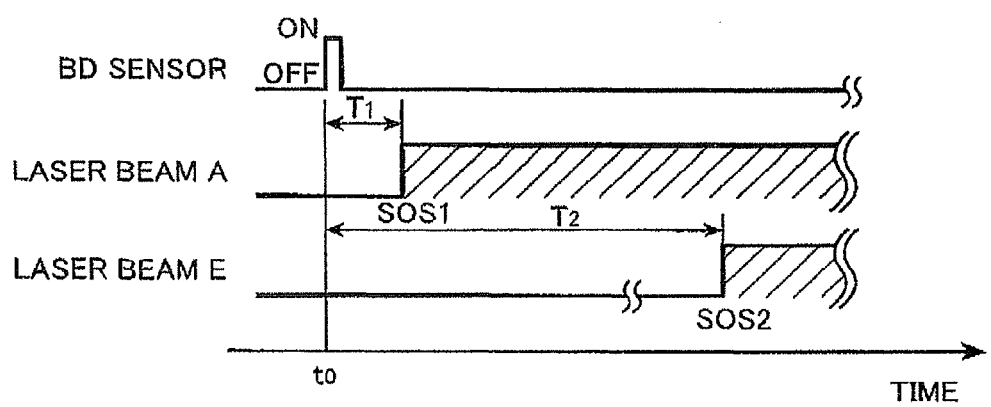
FIG. 11 is a timing chart illustrating start points for exposure by two laser beams.

Referring to FIGS. 10 and 11, the polygon mirror 406 is configured of six reflecting surfaces arranged in a polygonal shape. The respective reflecting surfaces are designated as A, B, C, D, E, and F in a clockwise direction. When the BD sensor 421 detects a laser beam A reflected by the reflecting surface at the time $t_0$, the laser beam A is controlled to start scanning over a predetermined exposure region based on video signals after the time amount of T1 has elapsed from the time $t_0$.

On the other hand, a light beam E reflected by a reflecting surface E is controlled to scanning over a predetermined exposure region based on video signals, after the time amount of T2 (>T1) has elapsed from the time $t_0$.

In this embodiment, the polygon mirror 406 is configured of six reflecting surfaces A, B, C, D, E, and F to deflect and angularly move the laser beams emitted from the light sources 403 by means of the rotation thereof. Accordingly, if an angle formed by the adjacent reflecting surfaces deviates from the design value, the position of the light beam E on the photosensitive drum 510 after the time period T2 has elapsed from the time $t_0$ is deviated from the design value. Consequently, the electrostatic latent image formed by the light beam E may be out of a proper position.

In this embodiment, an angle θ1 is an angle formed by the normals of the adjacent reflecting surfaces of the polygon mirror 406, and stored in the ROM 443 as the laser beam characteristics. The controller 110 corrects the start timing of the exposure process based on the actual value of the angle θ1.

In this embodiment, an angle θ2 (see FIG. 10) is formed by the normal of the reflecting surface A deflecting the laser beam toward the BD sensor 421 and the normal of the reflecting surface E. Accordingly, it is preferable that the angle θ2 is $(2\pi/n) \times m +/- \Delta\theta$. The polygon mirror 406 is configured so that the absolute value of $\Delta\theta$ is smaller than $25.4/(r \times f)$. Preferably, $\Delta\theta$ is considerably smaller than $2\pi/n$. In the above formula, n: number of reflecting surfaces (6 in this embodiment)

m: a natural number in the range of $1 \leq m \leq (n-1)$ (2 in this embodiment)

Δθ: manufacture error angle (rads) formed by adjacent reflecting surfaces of the polygon mirror f: focal length (mm) of the fθ lenses 407 r: resolution (dpi; 600 dpi, for example)

If the absolute value of Δθ is more than or equal to $25.4/(r \times f)$, the color image formed on the paper may have a color registration problem, which results in the degradation in the image quality of the color image on the paper.

Since the laser beam characteristics are stored in the ROM, a service technician or even an end-user can replace or repair the scanning unit 400 easily, without requiring a special measuring instrument for measuring the laser beam characteristics. Hence, the technician or end-user can easily repair the laser printer 100, without needing to take the laser printer 100 to a special service center.

Further, since the laser beam characteristics are stored in the ROM 443 of the scanning unit 400, even if the laser beam characteristics are measured on a special assembly line (at the factory) when assembling the scanning unit 400, the manufacturer need not re-measure the laser beam characteristics on an assembly line after completing assembly of the laser printer 100. The laser emitting timings of the semiconductor lasers 401 can be automatically adjusted by reading the laser beam characteristics from the ROM 443. Hence, the number of steps required for assembling the laser printer 100 can be reduced, thereby improving productivity and reducing the unit cost of manufacturing the laser printer 100.

Further, by configuring the ROM 443 of a semiconductor, more data can be stored than when the light beam characteristics are stored as barcodes or other storing means. The controller 110 can easily and readily use the laser beam characteristics. The manufacturing and maintenance of the scanning unit 400 can be easily performed.

Further, by accommodating the polygon mirror 406 and fθ lenses 407 in a single casing 430, the light beam characteristics stored in the ROM 443 can include the relative positional deviations among the laser beams, unlike a laser printer provided with scanning units for each color (each photosensitive drum 510). Hence, the ROM 443 can store light beam characteristics reflecting the actual usage state of the laser printer 100.

Since the laser emitting timings of the semiconductor lasers 401 can be more suitably adjusted, the laser printer 100 can improve the quality of images formed on paper.

Further, since the single polygon mirror 406 deflects and scans all four laser beams emitted from four light sources 403, the laser printer 100 can reduce the amount of data that is stored as laser beam characteristics, thereby requiring less capacity for the ROM 443 than when a plurality of polygon mirrors 406 are provided.

When employing the single polygon mirror having a plurality of reflecting surfaces as the deflector, the polygon mirror 406 may be configured to deflect and scan all laser beams emitted from the plurality of light sources 403 from two different reflecting surfaces simultaneously or from the same reflecting surface. However, the method of deflecting and scanning the laser beams with the same reflecting surface necessarily lengthens the optical path of the laser beams from the light sources 403 to the photosensitive drums 510, making it difficult to design the fθ lenses 407.

The technique for simultaneously deflecting and scanning laser beams from two different reflecting surfaces facilitates the design of the fθ lenses 407. However, the laser emitting timings of the light sources 403 is required to be controlled with great precision, because the laser beams are simultaneously deflected and scanned by two different reflecting surfaces.

Since the deflector is the polygon mirror 406 having a plurality of reflecting surfaces and functioning to deflect and scan the laser beams simultaneously using two different reflecting surfaces, the design of the fθ lenses 407 is simplified, but the characteristics of the laser beams differ among the photosensitive drums 510 due to the manufacturing errors in the fθ lenses 407. Therefore, the laser emitting timing of the light sources 403 is required to be controlled with great accuracy.

However, in addition to facilitating the design of the fθ lenses 407, the laser emitting timing of the light sources 403 can be controlled with great accuracy since the laser beam characteristics corresponding to each of the photosensitive drums 510 are stored in the ROM 443.

Figure 12:
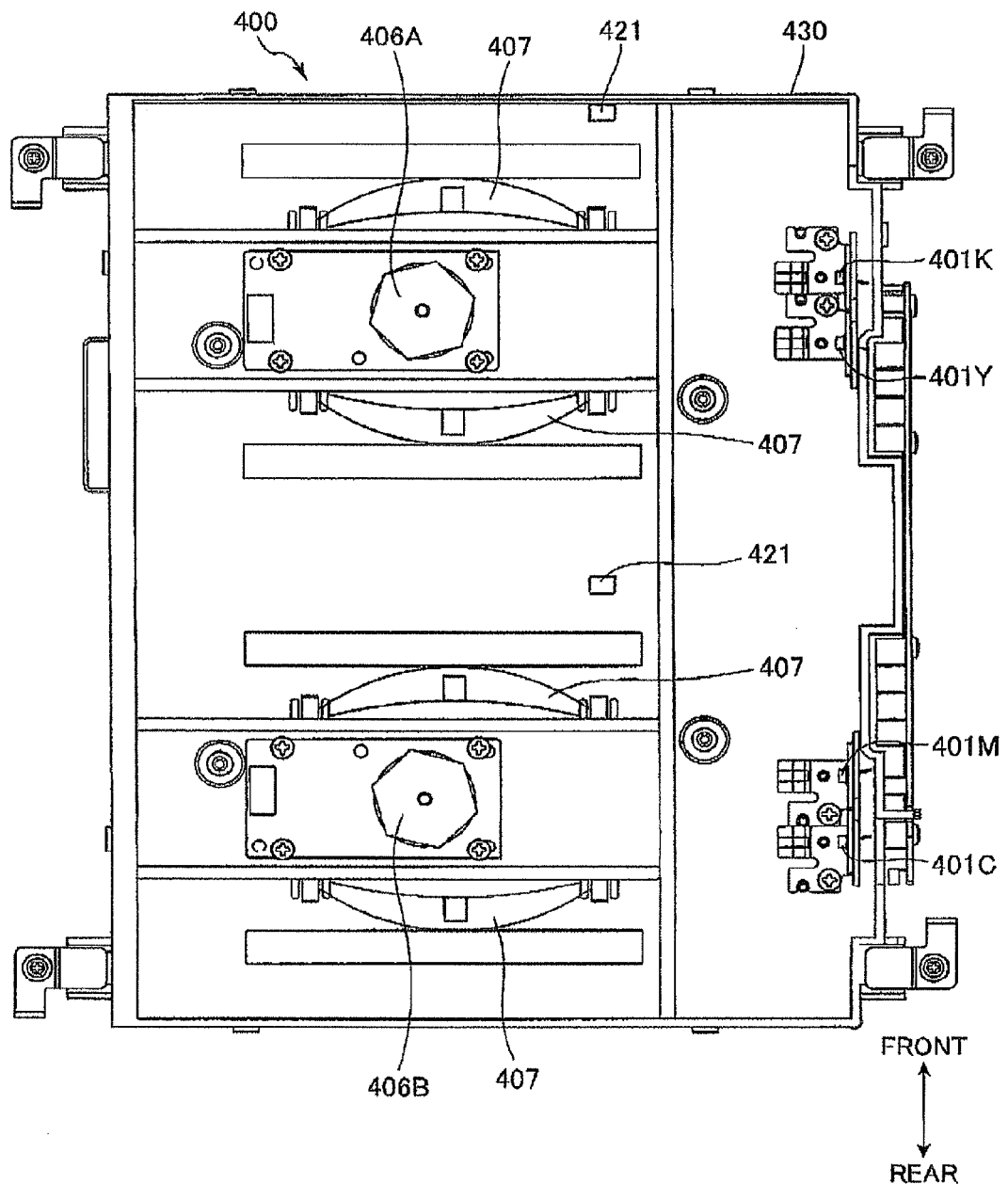
FIG. 12 is a plan view showing a scanning unit according to a second embodiment.

The second embodiment will be described as follows. In this embodiment, the scanning unit has a plurality of polygon mirrors (deflectors). Referring to FIG. 12, the scanning unit 400 has two polygon mirrors; a first polygon mirror 406A and a second polygon mirror 406B.

Referring to FIG. 12, the first polygon mirror 406A deflects and scans two laser beams to be guided to the photosensitive drums 510K and 510C, while the second polygon mirror 406B deflects and scans the other two laser beams to be guided to the photosensitive drum 510K and 510C.

In addition to the laser beam characteristics described above, the ROM 443 stores data related to rotational error between the polygon mirrors 406A and 406B. The rotational error is stored because the electrostatic latent images formed with laser beams scanned by the first polygon mirror 406A and electrostatic latent images formed with laser beams scanned by the second polygon mirror 406B may be offset when the rotational periods of the polygon mirrors 406A and 406B differ. The rotation of the polygon mirror 406A is required to be synchronized with the rotation of the polygon mirror 406B.

In the above embodiment, the polygon mirror is used as the deflector. However, any rotatable deflector for deflecting a laser beam can be used in the present invention. For example, a resonant scanner or a galvano scanner can be used as a deflector.

Further, in the present invention, a BD sensor can be provided for the respective light sources 403, thereby determining the start timing of the exposure process for each laser beam.

While the invention has been described in detail with reference to specific embodiments thereof, it would be apparent to those skilled in the art that many modifications and variations may be made therein without departing from the spirit of the invention, the scope of which is defined by the attached claims.

What is claimed is:

1. An optical scanner used for an image-forming device to form a color image, the image-forming device having a plurality of photosensitive drums for superimposing a developer image formed on each of the plurality of photosensitive drums, comprising:

a casing;

a plurality of light sources in a one-to-one correspondence with the plurality of photosensitive drums, each of the plurality of light sources emitting a laser beam;

a single deflector provided in the casing that deflects all of the laser beams to respective ones of the plurality of photosensitive drums, the single deflector being a rotatable polygon mirror having a plurality of reflecting surfaces, at least two of the plurality of reflecting surfaces simultaneously deflecting and angularly moving the laser beam, respectively;

an optical system provided in the casing for guiding the deflected laser beam to a corresponding one of the plurality of photosensitive drums to make the laser beam scan the corresponding one of the plurality of photosensitive drums, the optical system further comprises a scanning lens that makes the laser beam scan on the corresponding one of the plurality of photosensitive drums at a constant linear velocity;

a storage device that stores a characteristic related to the laser beam scanning the corresponding one of the photosensitive drums; and a single optical sensor for detecting the laser beam deflected and scanned by the deflector at a reference position, wherein one of the plurality of reflecting surfaces has a first normal to deflect the laser beam emitted from one of the plurality of light sources to the single optical sensor, another of the plurality of reflecting surfaces has a second normal to deflect the laser beam emitted from another of the plurality of light sources toward an opposite side of the single optical sensor with respect to the rotatable polygon mirror, and an angle formed by the first normal and the second normal satisfies a following formula:

$(2\pi/n) \times m +/- \Delta\theta$, where n is a number of the plurality of reflecting surfaces, m is a natural number within a range of $1 \leq m \leq (n-1)$, and $\Delta\theta$ is a manufacture error angle (rad) of adjacent ones of the plurality of reflecting surfaces; and $\Delta\theta$ has an absolute value less than $25.4/(r \times f)$, where f is a focal length (mm) of the scanning lens, and r is a resolution (dpi).

2. The optical scanner according to claim 1, wherein the storage device stores a linearity of a scan line provided by the laser beam scanning on the corresponding one of the plurality of photosensitive drums as the characteristic.

3. The optical scanner according to claim 2, wherein each of the scan lines are divided into a plurality of segments, and the storage device stores a scanning time for which the laser beam scans each segment, as the characteristic.

4. The optical scanner according to claim 2, wherein each of the scan lines are divided into a plurality of segments, and the storage device stores a position of the scan line in a sub-scanning direction for each of the plurality of segments as the trajectory.

5. The optical scanner according to claim 1, wherein the storage device stores a trajectory of the scan line as the characteristic.

6. The optical scanner according to claim 1, wherein
the storage device stores a start timing for the laser beam to start exposing the corresponding one of the plurality of photosensitive drums after the single optical sensor detects the laser beam.

7. The optical scanner according to claim 1, wherein the storage device is made from a semiconductor chip.

* * * * *